(12) United States Patent
Melz et al.

(10) Patent No.: US 8,186,490 B2
(45) Date of Patent: May 29, 2012

(54) PUSHING FORCE DEVIATING INTERFACE FOR DAMPING MECHANICAL VIBRATIONS

(75) Inventors: Tobias Melz, Darmstadt (DE); Michael Matthias, Darmstadt (DE); Holger Hanselka, Darmstadt (DE)

(73) Assignee: Fraunhofer-Gesellschaft zur Forderung der Angewadten Forschung E.V., Munich (DE)

( * ) Notice: Subject to any disclaimer, the term of this patent is extended or adjusted under 35 U.S.C. 154(b) by 1464 days.

(21) Appl. No.: 11/578,453

(22) PCT Filed: Apr. 15, 2005

(86) PCT No.: PCT/EP2005/004021
§ 371 (c)(1),
(2), (4) Date: Oct. 13, 2006

(87) PCT Pub. No.: WO2005/100816
PCT Pub. Date: Oct. 27, 2005

(65) Prior Publication Data
US 2007/0212939 A1 Sep. 13, 2007

(30) Foreign Application Priority Data
Apr. 16, 2004 (DE) .......................... 10 2004 019 242

(51) Int. Cl.
*F16F 7/00* (2006.01)
(52) U.S. Cl. ..................................... 188/266.7; 267/136
(58) Field of Classification Search ............... 188/266.7; 267/136, 158–165
See application file for complete search history.

(56) References Cited

U.S. PATENT DOCUMENTS
4,499,772 A 2/1985 Haas
5,927,699 A 7/1999 Nakajima et al.

FOREIGN PATENT DOCUMENTS

| | | | |
|---|---|---|---|
| DE | 19527514 A1 | | 1/1997 |
| DE | 19610692 A1 | | 9/1997 |
| DE | 19925982 A1 | | 12/2000 |
| EP | 0384947 A3 | | 9/1990 |
| EP | 0756103 B1 | | 1/1997 |
| GB | 2060179 A | * | 4/1981 |
| GB | 2222657 A | | 3/1990 |
| JP | 61286634 A | * | 12/1986 |
| WO | WO/2005/010399 | | 2/2005 |

OTHER PUBLICATIONS

Hagood, N.W, et al.; "Damping of Structural Vibrations With Piezoelectric Materials and Passive Electrical Networks," *Journal of Sound and Vibration* (1991), 146(2), 243-268.
Mayer, D., et al.; "Synthetische Induktivitäten für die semi-passive Dämpfung, (Synthetic Inductances for Semi-Passive Damping)" fifth Magdeburger Machine Construction Days, 2001.

* cited by examiner

*Primary Examiner* — Bradley King
(74) *Attorney, Agent, or Firm* — IPxLAW Group LLP; Claude A. S. Hamrick (57) ABSTRACT

The invention relates to an interface for controlling (for example damping) mechanical vibrations for the automotive industry. The inventive interface comprises a base connection element, a load connection element and at least one energy converting system extending between the base connection element and the load connection element. The different energy converters of the one energy converting systems have a common preferential direction and are exposed to a preload action produced by a pretensioning element. The inventive interface also comprises a pushing force deviating element mounted between the base connection element and the load connection element which is provided with a membrane or a leaf spring disposed preferably in a perpendicular direction with respect to the preferential direction of the energy converting system. The inventive pushing force deviating element protects the energy converting systems against mechanical damage caused by an external pushing action.

10 Claims, 5 Drawing Sheets

PUSHING FORCE DEVIATING INTERFACE FOR DAMPING MECHANICAL VIBRATIONS

CROSS REFERENCE TO RELATED APPLICATIONS

This application is a U.S. National Phase of PCT/EP2005/004021, filed Apr. 15, 2005, which claims the benefit of priority from German Patent Application Number 102004019242.1-13, filed Apr. 16, 2004, the disclosures of which are incorporated herein by reference.

Description

The invention relates to a device for controlling, particularly for damping or reducing, mechanical vibrations by means of one or more energy converter systems. Such interfaces are used, for example, for damping vibrations in the field of general engine construction, automotive engineering, structural engineering or aerospace technology.

In machines, vehicles and similar assemblies, dynamic mechanical disturbances in the form of vibrations, excited e.g. by the operation of generating sets (for example generating sets for power generation) or by other environmental conditions, are produced. The frequencies of these vibrations extend into the higher-frequency structurally acoustic range and produce unwanted dynamic and/or acoustic effects locally at the location where the interference is produced or introduced or after it has been transmitted via mechanical load paths at a greater distance. This results in loss of comfort, safety problems, component damage due to structural fatigue, reduced service life, reduced functionalities etc.

PRIOR ART

To control (e.g. dampen or isolate) mechanical vibrations, the so-called damping by material is frequently used in which the mechanical energy of the vibration is directly converted into thermal energy. Examples of this are elastic or viscoelastic damping systems.

In addition, measures are increasingly used which are based on other energy converting systems. These energy converting systems, as a rule, convert mechanical energy into electrical energy and conversely. Both effects are used for controlling (particularly for damping) mechanical vibrations. As a rule, a distinction is made between active, semi-active and semi-passive and passive systems.

In passive and semi-active or semi-passive vibration control, the mechanical energy of the vibrations is first converted into electrical energy with the aid of an electromechanical energy converter (e.g. piezoceramics). In the case of passive vibration damping, this electrical energy is then dissipated in a passive electrical circuit, (e.g. an ohmic resistor), i.e. converted into thermal energy or, in the case of the semi-active or semi-passive vibration damping, diverted with the aid of an electrical circuit having an external electrical auxiliary energy source (e.g. an electrical canceller). Such systems are described, for example, in N. W. Hagood and A. von Flotow: Damping of Structural Vibrations with Piezoelectric Materials and Passive Electrical Networks, Journal of Sound and Vibration 146 (2), 243 (1991).

In active vibration control, at least one actuator system is connected between an interference source (base side) and a connection side. In this context, the actuator is an energy converter which can convert, e.g. electrical signals into mechanical movements, for example a piezoelectric actuator, a magnetostrictive actuator or else a conventional pneumatic actuator. The deciding factor is that the characteristic (e.g. extension) of the actuator is variable under controlled conditions by a drive signal. An example of a system for active vibration control with the aid of actuator elements is disclosed in U.S. Pat. No. 5,660,255. Actuator elements and a small additional mass are introduced between a base housing and a useful load to be isolated. On the small mass, sensors are attached which register the displacement of the small mass. From the displacement, a control signal of the actuator elements is generated with the aid of an electronic control system and an external electrical energy source. The actuator elements are driven in such a manner that the vibration movement is largely eliminated at the location of the useful load.

Apart from being used for active, passive and semi-active or semi-passive vibration control, the electromechanical energy converters can also be used at the same time as actuators for mechanically positioning a useful load. This can be done, for example, in that an annular arrangement of a plurality of actuators is integrated into a vibration-reducing interface which can effect, e.g., a deliberate tilting of a structure with respect to a base. Such a system is disclosed, for example, in DE 195 27 514 C2.

For constructional or structurally mechanical reasons, actuator systems are frequently operated in practice with a preload which is intended to prevent damage. This is frequently a mechanical preload in the form of a pressure or tensile load on the actuator system. In the case of piezoelectric actuators, for example, in which an extension beyond the length at rest (i.e. length of the actuator without electrical voltage applied) would lead to mechanical damage of the actuator, operation without pretension is not appropriate or not possible, in practice. The constructive implementation of a device for exerting a pretension, however, presents a problem, particularly in the actuator or actuators, the direction of extension of which extends parallel to the force exerted by the useful load (for example the force of the weight) and thus has a frequently negative effect on the actuatory effectiveness. In U.S. Pat. No. 5,660,255, no satisfactory solution to this problem is disclosed.

In DE 195 27 514 C2, an interface for reducing vibrations in structurally dynamic systems is disclosed in which vibrations are isolated between a component at the structure end and a component at the base end by means of a plurality of actuators having a main direction. A compressive pretension on the actuators is ensured by anti-fatigue bolts between the component at the base end and the component at the structure end.

Such a rigid mechanical connection between the component at the base end and the component at the structure end has the disadvantage, however, that this creates a bridge via which vibrations can propagate from a disturbance source at the base end to the component at the structure end. In addition, the actuators are only inadequately protected against transverse loads perpendicular to their main direction (shear). This can easily lead to damage of the sensitive actuators. In addition, this solution means that the actuator effectiveness is influenced, in most cases reduced, due to a stiffness-related loss in expansion.

Object

It is the object of the invention to specify an improved device for controlling, particularly for damping, mechanical vibrations by means of one or more energy converting systems. In this device, the energy converting systems should exhibit a preferred direction and be used in such a manner that they are protected from mechanical loads outside the actuator's preferred direction, particularly perpendicular to this preferred direction.

Solution

This object is achieved by the invention having the features of the independent claim. Advantageous developments of the invention are characterized in the subclaims.

An interface for controlling, particularly for damping mechanical vibrations is proposed which has a base connection element, a load connection element, and at least one energy converting system. The energy converting system extends between the base connection element and the load connection element and has a preferred direction.

Furthermore, at least one pretensioning element and one shear diverting element extend between the base connection element and the load connection element. The pretensioning element exerts a mechanical preload on the energy converting system. The shear diverting element has a two-dimensional element, particularly a diaphragm or leaf spring, arranged essentially at right angles to the preferred direction. The base connection element is joined to at least one first area of engagement on the two-dimensional element via at least one first connection. The load connection element is joined to at least one second area of engagement on the two-dimensional element via at least one second connection. The areas of engagement of the base connection element and of the load connection element should not coincide.

An interface is understood to be a module which can be integrated, for example into load paths of machines, vehicles and similar assemblies with relatively little constructional effort. The interface can be incorporated in mechanical structures

- as a bearing element
- as a modular transfer element and/or
- as an actuating element.

For this purpose, the load connection element and the base connection element can be provided, for example, with standard devices (for example internal and/or external threads, flanges etc.) for connecting other elements. The interface is then used for isolating disturbances at the base end from elements connected at the load end.

An energy converting system is understood to be a system which has at least one energy converter. Depending on application and requirements, these energy converters can be based on various physical principles. Piezoelectric actuators, in particular, have been found to be particularly advantageous. However, actuators based on so-called shape memory alloys or other materials with memory effect, and magneto- or electrostrictive actuators, pneumatic or hydraulic actuators, magneto- or electrorheological fluid actuators and damping elements can also be advantageously used. Combinations of various energy converting systems are also possible, for example the combination (e.g. a series or parallel connection) of a piezoelectric actuator with a "conventional" damping system such as, for example, a spring/rubber damper system.

Vibrations in different frequency ranges can also be compensated by combining various principles of action, that is, e.g. high-frequency vibrations by an active or passive damping by means of piezoelectric actuators, low-frequency vibrations by conventional damping elements (e.g. viscoelastic dampers).

The energy converting system should exhibit a preferred direction which is frequently also called the main effective direction of the energy converting systems. This can occur, for example, due to the fact that a number of actuators, e.g. piezoelectric actuators, are used with a common effective direction. However, this does not necessarily mean that the interface has only one degree of freedom for the vibration damping. Unequal drive or extension of the individual piezoelectric actuators can achieve a tilting of the load connection element relative to the base connection element by means of which it is possible to control or compensate (in particular dampen) not only purely translatorial vibrations of the load connection element but, for example, also tilting vibrations or rotational vibrations.

The pretensioning element exerts a preload on the at least one energy converting system. This preload can be, for example, a mechanical compressive or tensile load. Optionally, an operation with a preload of zero is also possible, that is to say an operation in which no preload-related force is exerted on the energy converting systems. Optionally, this preload (including the preload of zero) can also be combined, for example, with an electric or electromechanical preload. The preload element can be elastic or inelastic. The preload can be exerted directly or indirectly on the energy converting systems, that is to say, for example, also indirectly via an additional spring system.

It has been found to be particularly advantageous if the pretensioning element has a tube enclosing the energy converting system. This can be, for example, a tube of an elastic material, for example a thermoplastic plastic or an elastomer which is joined firmly to the base connection element at one end and joined firmly to the load connection element at the other end and, for example, exerts a compressive pretension on the at least one energy converting system. The tube does not necessarily need to be completely closed but can also have, for example, slots or other openings. The cross section of the tube can vary, for example can be round or square. The tube protects the energy converting system against environmental influences and mechanical stresses. Isotropic and anisotropic materials can be used for the tube wall.

In many cases, systems for vibration control are simultaneously exposed to high loads, e.g. due to shearing forces. There are loads outside (especially perpendicular to) the preferred direction of the energy converting system, that is to say, for example, perpendicular to the preferred direction of the actuators. Such loads easily lead to damage of the energy converting systems, for example to a fracture of the sensitive piezoelectric actuators.

The proposed interface, therefore, exhibits the shear diverting element for protecting the energy converting systems. This shear diverting element should have little stiffness in the preferred direction of the energy converting system within the working range of the interface but high stiffness in at least one direction perpendicular to the preferred direction.

The two-dimensional element should be essentially two-dimensional but will always have a certain thickness in practice. This is achieved, for example, by using a diaphragm or leaf spring. This diaphragm or leaf spring can be plane or else curved and can consist, for example, of a thin spring sheet (e.g. with a ratio of 100:1 between the lateral extent and the thickness) and have, e.g. the form of a strip or of a round or cornered disk or thin plate.

The alignment of the diaphragm or leaf spring can be exactly 90° with respect to the preferred direction of the energy converting systems, but can also deviate slightly from the right angle (advantageously by no more than 20°).

The diaphragm or leaf spring should be joined to the base connection element and the load connection element. This joint can be made either directly, for example by bonding, screwing or soldering the diaphragm or leaf spring to the load or base connection element or separate connection elements (e.g. spacers) can be inserted between the load and base connection element, respectively, and areas of engagement on the diaphragm or leaf spring. The joint does not necessarily have to be rigid but can also be made, for example, by a guide which is movable in the preferred direction.

The areas of engagement of the joints between base connection element and diaphragm or leaf spring and between load connection element and diaphragm or leaf spring should, however, not coincide, i.e. at least not be congruent. This ensures that forces exerted on the diaphragm or leaf spring by the base connection element and forces exerted on the diaphragm or leaf spring by the load connection element do not engage in the same area of the diaphragm.

This ensures that the load connection element and the base connection element are coupled "resiliently" via the flexible diaphragm or leaf spring in the preferred direction of the energy converting systems via the shear diverting element. Perpendicular to the preferred direction of the energy converting systems, however, the coupling is "rigid" due to the high stiffness of the diaphragm along its planar extent. In other words, reducing or enlarging the distance between the load connection element and the base connection element requires much less force than shearing (moving in parallel) the load connection element relative to the base connection element. Due to the flexibility (small spring constant) of the diaphragm perpendicular to its planar extent, the distance of the load connection element relative to the base connection element can be changed easily, i.e. with relatively little force expenditure. A transverse movement (shearing) parallel to the planar extent of the diaphragm, however, is possible only with considerable force expenditure due to the high stiffness of the diaphragm or leaf spring along its planar extent (high spring constant). Thus, the energy converting systems can optimally develop their effect along their preferred direction and control, particularly dampen, vibrations in this direction, but are protected against mechanical stresses perpendicular to this direction due to the diaphragm or leaf spring of the shear diverting element. At the same time, the shear diverting element, due to the low stiffness of the diaphragm or leaf spring in the preferred direction of the energy converting systems, does not open any distinct new load path, that is to say a stiff mechanical connection, via which disturbances (for example vibrations) propagate from the base connection element to the load connection element.

In an advantageous constructional embodiment of the interface, the shear diverting element can be utilized at the same time for exerting a preload on the energy converting system or systems. Thus, the shear diverting element is in this case identical to a pretensioning element or is a part of the pretensioning element or vice versa. This can lead to a reduction in the number of parts and thus to a reduction in the weight and the production costs for the interface.

As mentioned above, in many cases interfaces are used not only for vibration control but, at the same time, also as actuators for mechanically positioning loads. In this case, the maximum deviation of the interface, that is to say, for example, the maximum relative change in distance between base connection element and load connection element, plays a major role. As a rule, however, the relative change in length of energy converting systems, particularly of piezoelectric actuators, depends on the constructional length. To achieve a large deviation, energy converting systems with a large constructional length are thus required which, in turn, however, leads to a large total size of the interface.

In a further advantageous embodiment of the invention, therefore, the energy converting system has at least two subsystems, the individual subsystems being arranged "overlapping". For this purpose, a coupling element is introduced between the base connection element and the load connection element. A first subsystem extends between the base connection element and the coupling element; a second subsystem extends between the coupling element and the load connection element. In this arrangement, the coupling element can be constructed to be uneven so that the individual subsystems partially overlap in their preferred direction. In this manner, the constructional size of the interface can be reduced without the deviation of the interface being reduced as a result. This principle of the coupling element can be advantageously continued also by using, for example, two coupling elements and three individual subsystems, etc. The subsystems should again be arranged to be overlapping so that the overall deviation of the interface is enlarged without the constructional length being significantly increased.

The position of the coupling element is advantageously fixed relative to an axis parallel to the preferred direction of the energy converting system. This can be done by an additional centering element. This can be, for example, a further diaphragm which is aligned perpendicular to the preferred direction and is connected to the base connection element or the load connection element in various areas of engagement. This centering element prevents the coupling element from changing its position (for example due to mechanical production tolerances) perpendicular to the preferred direction of the energy converting system and, as a result, exerting a shear on the energy converting system.

The interface described in one of its embodiments can also be provided with an electronic circuit for active, passive or semi-active or semi-passive vibration reduction. This can be done in various ways.

For an active vibration control, actuators are advantageously used as energy converting systems. One or more sensors can be connected to the interface (for example to the load connection element). These can be sensors for determining, for example, distance, speed, acceleration or force, particularly capacitive or piezoelectric accelerometers or force sensors or magnetic, electrostatic or interferometric position or speed sensors.

The signals of the sensors are provided, for example, to control electronics. The control electronics generate from the sensor signals control signals (target function) which can be converted into actuating signals for the actuator systems via a power supply. These actuating signals excite the actuator systems into vibrations which, e.g. have the opposite phase to the vibrations to be isolated and eliminate or dampen these at the location of the load.

For a passive or semi-active or semi-passive vibration reduction, energy converting systems can be used, for example, which are wholly or partially arranged in such a manner that they convert mechanical energy into electrical energy. This electrical energy is then dissipated or otherwise used with the aid of an electronic circuit. In the simplest case, this electronic circuit consists of an ohmic resistor in which the electrical energy is dissipated at least partially in the form of heat.

An even more efficient vibration damping can be achieved by additionally using one or more coils and/or one or more capacitors (damped electrical resonant circuit) or so-called "synthetic inductances". As a rule, synthetic inductances consist of a combination of a number of ohmic resistors with one or more operational amplifiers. This makes it possible to achieve higher inductances than with conventional coils. This further increases the damping of the resonant circuit. This technique is described, for example, in D. Mayer, Ch. Linz, and V. Krajenski: *Synthetische Induktivitäten für die semipassive Dämpfung (synthetic inductances for semi-passive damping)*, fifth Magdeburger machine construction days, 2001.

The efficiency of the vibration damping can be increased further by connecting a number of the interfaces described above in one of the embodiments and circuitries described following one another in cascade. In this arrangement, the base connection element of the following interface is in each case connected to the load connection element of the preceding interface. This can be done in such a manner that the preferred directions of the following interfaces are aligned and parallel with the preferred direction of the preceding interface in each case. However, alignments perpendicular to the preferred direction or in other spatial directions are also possible. For this purpose, a rectangular mounting angle can be attached, for example, on the load connection element of an interface in each case, on which the base connection element of a subsequent second interface, in turn, can be attached. This makes it possible to control, for example, vibrations in various spatial directions.

In the text which follows, the invention will be explained in greater detail with reference to exemplary embodiments which are shown diagrammatically in the figures. However, the invention is not restricted to the examples. Identical reference numbers in the individual figures designate identical or functionally identical elements or elements corresponding to one another with respect to their functions. In detail:

FIG. 4b is a partially broken cross-section of the exploded interface taken along the lin 4b-4b as depicted in FIG. 4a.

Figure 1:
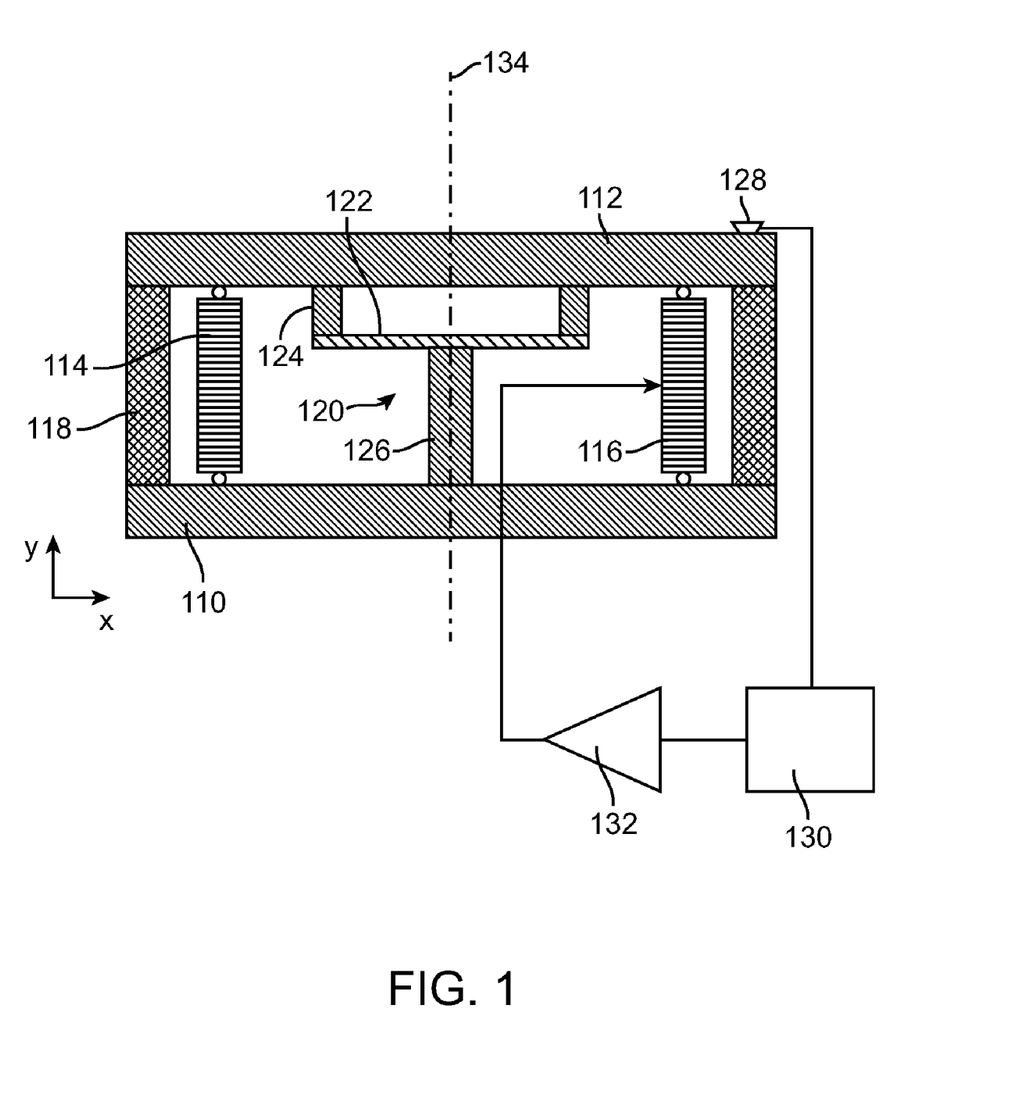
FIG. 1 shows a side view of a first embodiment of an interface for damping mechanical vibrations with a single piezoelectric actuator system and a diaphragm for shear diversion.

FIG. 1 shows a first embodiment of an interface for controlling (particularly damping) mechanical vibrations with a cylindrical cross section. The interface has a base connection element 110 and a load connection element 112, both in the form of a flat round disk. Between the base connection element 110 and the load connection element 112, a piezoelectric actuator system 114, 116 extends. The base connection element 110 and the load connection element 112 are joined by a tubular pretensioning element 118 of PVC which exerts a pressure (preload) on the piezoelectric actuator system 114, 116. Furthermore, the base connection element 110 is joined to the load connection element 112 by a shear diverting element 120. The shear diverting element 120 has a diaphragm 122 in the form of a circular thin disk machined from spring steel. Along its circumference, this diaphragm 122 is joined to the load connection element 112 by a circular connection element 124. The center of the diaphragm 122 is joined to the base connection element 110 via a second cylindrical connection element 126 with a high modulus of rigidity with shearing in the direction perpendicular to the y axis.

The piezoelectric actuator system 114, 116 is protected by the shear diverting element 120 described against actions of forces perpendicular to its preferred direction (y direction in FIG. 1). The diaphragm 122 has high flexibility in the y direction, but high stiffness perpendicular thereto (for example in the x direction).

The pretensioning element 118 keeps the piezoelectric actuators 114, 116 under a constant pretension which is adjusted in such a manner that the piezoelectric actuators 114, 116 operate optimally depending on the type of construction and are protected against elongation at break. The pretensioning element 118 is constructed to be tubular and completely encloses the piezoelectric actuator system 114, 116 as a result of which no moisture or contamination can reach the piezoelectric actuator system 114, 116. Furthermore, the piezoelectric actuator system 114, 116 is protected against direct mechanical effects, for example against hits.

As an alternative, however, the tubular pretensioning element 118 can also be omitted. In this case (not shown), the shear diverting element 120 at the same time handles the task of pretensioning the piezoelectric actuators 114, 116. The length of the connection element 126 is then adjusted in such a manner (for example by correspondingly shortening it) that the length of the shear diverting element 120 is less in a state of rest than the length of the piezoelectric actuators 114, 116. As a result, a pressure is exerted on the piezoelectric actuators 114, 116.

The arrangement shown in FIG. 1 is well suited for isolating vibrations of the base connection element 110 in the y direction (for example caused by a disturbance source at the base end) from the load connection element 112. For this purpose, the principle of active vibration reduction can be used, for example, which is shown greatly simplified in FIG. 1: an accelerometer 128 on the load connection element 112 is connected to control electronics 130 (shown diagrammatically) which convert a vibration signal generated by the accelerometer 128 into a control signal for the piezoelectric actuator system 114, 116. This control signal is then converted into a corresponding voltage signal by amplifier electronics 132 and supplied to the piezoelectric actuator system 114, 116. In this manner, the piezoelectric actuator system 114, 116 can generate vibrations in the load connection element 112 which become destructively superimposed on the vibrations transferred from the base connection element 110 and, in the ideal case, completely eliminate the vibrations of the load connection element.

If a number of accelerometers 128 are used, tilting vibrations, for example, can also be eliminated in a similar manner. This requires the piezoelectric actuators 114, 116 to be driven differently electrically and thus expand differently. The load connection element 112 is then tilted relative to the base connection element 110 and can perform a tilting vibration when driven correspondingly, which, for example, eliminates a tilting vibration of the base connection element 110 of the opposite phase. If other piezoelectric actuators are arranged annularly about an axis of symmetry 134, rotational vibrations or wobble movements can be correspondingly eliminated.

In an alternative embodiment (not shown), the voltage between opposite ends of a piezoelectric actuator 114, 116 can also be picked up and used for passive vibration damping. If the load connection element 112 vibrates relative to the base connection element 110, the piezoelectric actuator converts the mechanical vibration energy into an electrical voltage signal and the voltage between the opposite ends of the piezoelectric actuator 114, 116 varies periodically. If this voltage is supplied to a damped electrical resonant circuit, the electrical vibration is damped and energy is removed from the system. As a result, the vibration between the load connection element 112 and the base connection element 110 is damped.

The electrical energy can be correspondingly used by suitable electrical circuitries for energy recovery, for example for charging an electrical energy store.

Figure 2:
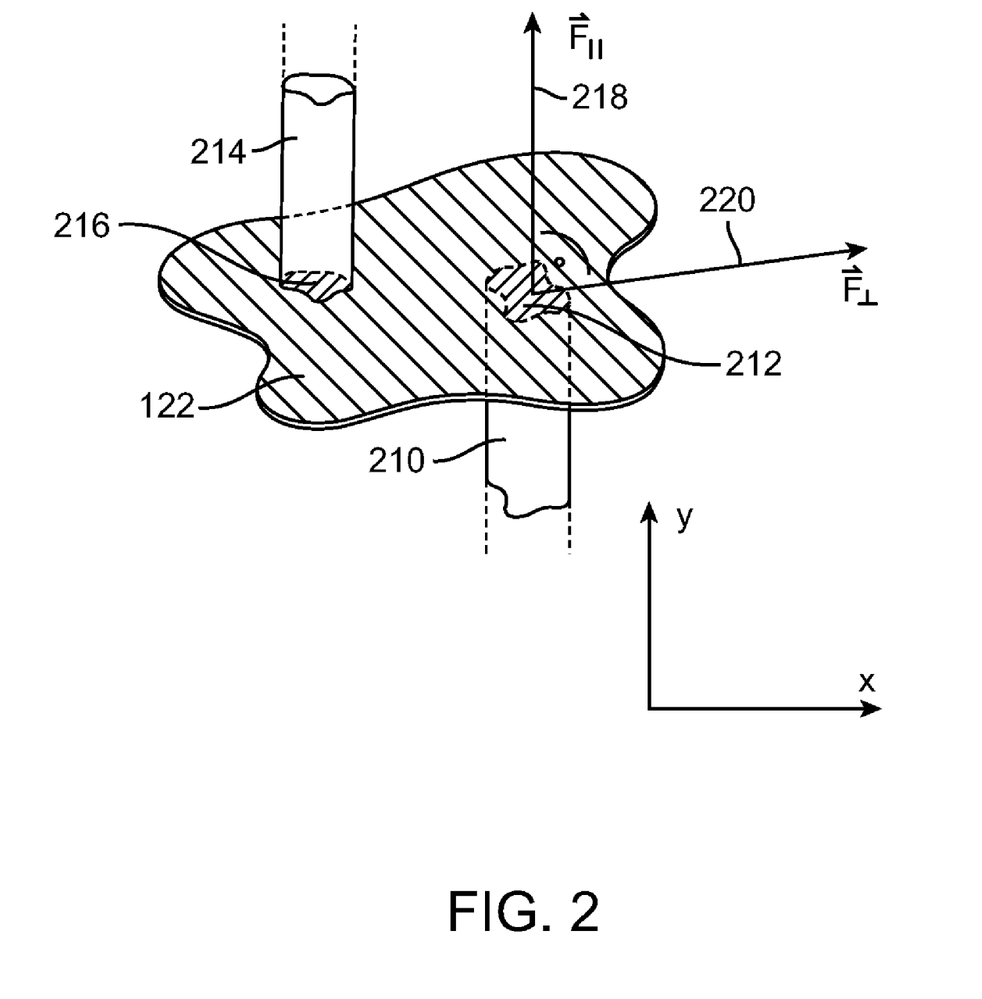
FIG. 2 shows a basic diagram on the action of forces parallel and perpendicular to the preferred direction of the energy converting systems onto a diaphragm.

FIG. 2 shows in a basic diagram the operation of a diaphragm 122 for diverting critical mechanical loads from the actuators. The diaphragm is joined to the base connection element (not shown in FIG. 2) of an interface via a connection element 210 which engages at the diaphragm 122 in an area of engagement 212. Analogously, the diaphragm 122 is joined to the load connection element (also not shown in FIG. 2) of the interface via a connection element 214 which engages at the diaphragm 122 in an area of engagement 216. The areas of engagement 212 and 216 are spatially separate from one another.

The diaphragm 122 is arranged perpendicular to the preferred direction of an energy converting system (also not shown in FIG. 2). In FIG. 2, this preferred direction is called the y direction. If a force acts via the connection element 210 to the base connection element with a force 218 (symbolized by an arrow) in the preferred direction on the area of engagement 212 of the diaphragm 122, this area of engagement 212, due to the high flexibility of the diaphragm 122 perpendicular to its planar extent, is slightly displaced in the y direction relative to the area of engagement 216 of the load connection element. If, however, a force 220 acts in a plane perpendicular to the preferred direction (for example in the x direction), the diaphragm 122 opposes this force with a high mechanical resistance. The area of engagement 212 of the base connection element is therefore displaced only insignificantly relative to the area of engagement 216 of the load connection element.

Figure 3:
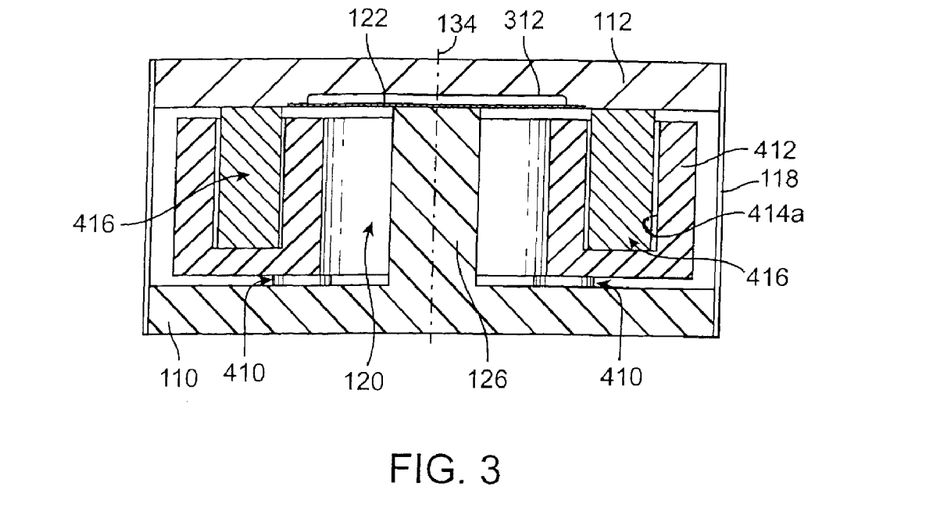
FIG. 3 shows a side view of a second embodiment of an interface for damping mechanical vibrations with two individual piezoelectric actuator systems and one diaphragm for shear diversion.
Figure 4:
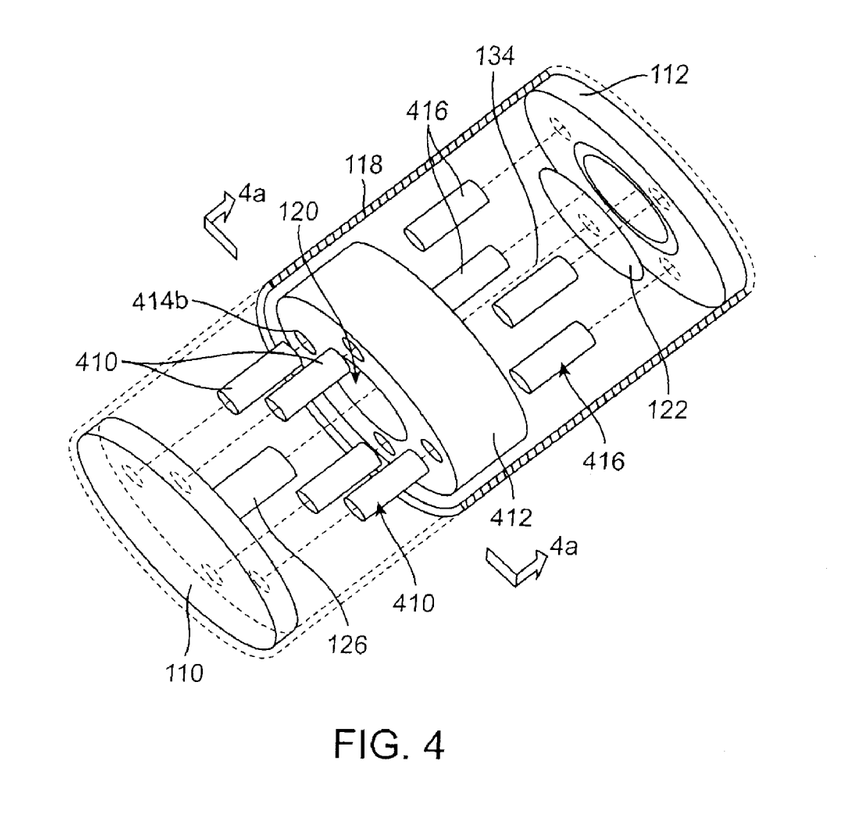
FIG. 4 shows an exploded view of the interface shown in FIG. 3.

In FIG. 3 (sectional view) and FIG. 4 (exploded view), a cylindrical interface corresponding to a preferred or alternative exemplary embodiment to FIG. 1 is shown. The interface has a base connection element 110, a load connection element 112, a tubular pretensioning element 118 (shown partially broken away in FIG. 4), and a shear diverting element 120 with a cylindrical connection element 126 and a circular metal diaphragm 122. The operation of the shear diversion is identical to the embodiment shown in FIG. 1.

In this exemplary embodiment, however, the piezoelectric actuator system is divided into two subsystems: a first piezoelectric actuator subsystem, consisting of four actuators 410 (FIG. 4) arranged annularly about the axis of symmetry 134, extends between the base connection element 110 and an annular coupling element 412 arranged between the base connection element 110 and the load connection element 112. This coupling element 412 is configured in the form of an annular ring having a cylindrical opening through which the connection element 126 extends. Into the flat underside of the coupling element 412, four corresponding blind holes 414 (see 414b in FIG. 4b), open towards the base connection element 110, are provided for receiving the piezoelectric actuators 410 of the first piezoelectric actuator subsystem.

As shown in FIG. 3, a second piezoelectric actuator subsystem extends correspondingly between the load connection element 112 and the coupling element 412. The second piezoelectric actuator subsystem again consists of four individual piezoelectric actuators 416 which are arranged symmetrically about the axis of symmetry 134, the piezoelectric actuators 416 being rotated by 45.degree. relative to the arrangement of the piezoelectric actuators 410. The actuators 416 are also partially introduced into corresponding blind holes 414 which are formed in the upper level surface of the coupling element 412 and open towards the load connection element 112.

Figure 4A:
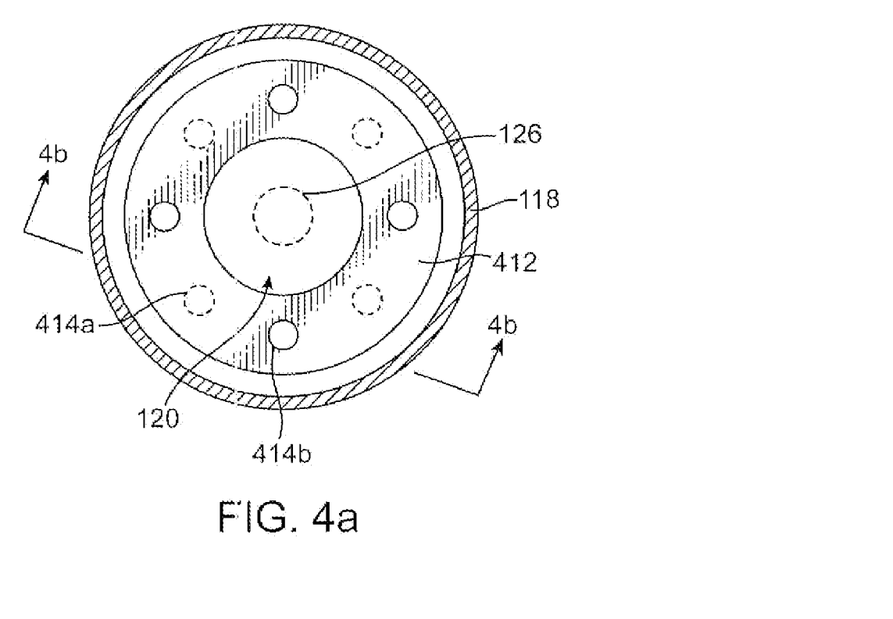
FIG. 4a is a transverse cross-section of the exploded interface taken in the plane 4a-4a as depicted in FIG. 4.
Figure 4B:
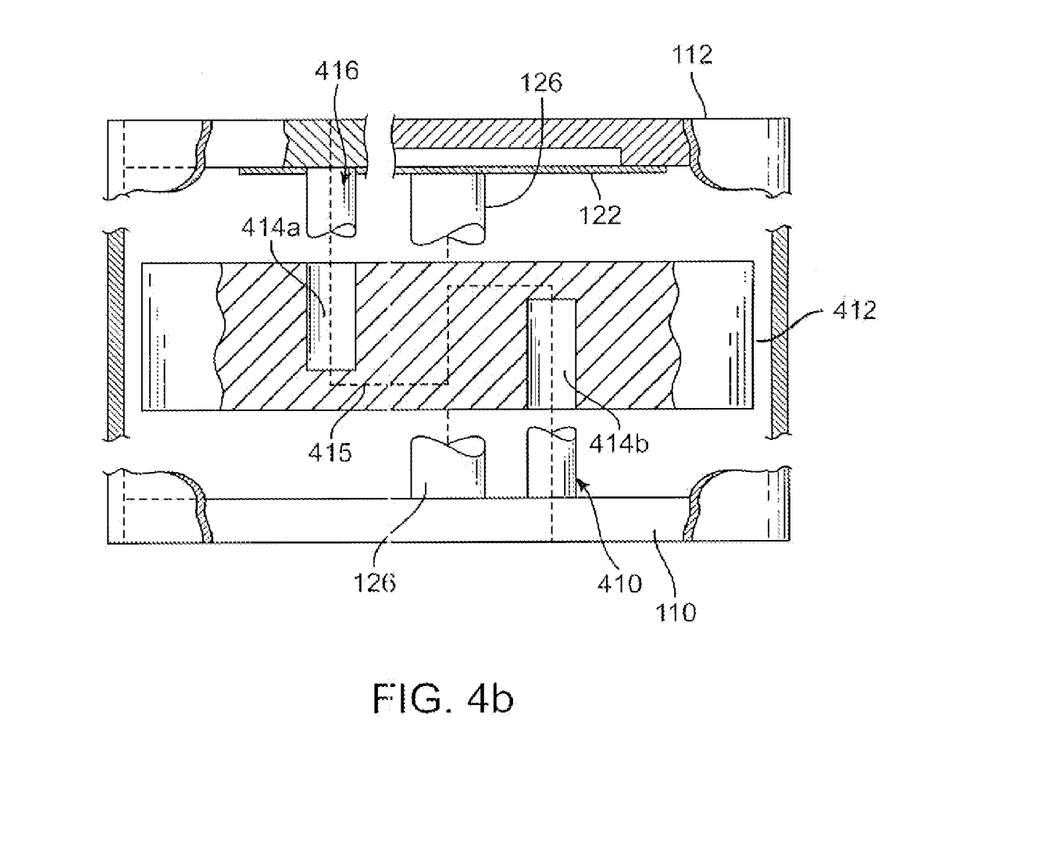

Since the blind holes 414 (better illustrated by 414a and 414b in FIGS. 4a and 4b are arranged in each case rotated by 45 degrees (as best depicted in FIG. 4b where for the sake of clarity only one pair of upper and lower actuator is depicted), the actuators 410, 416 of the first and the second piezoelectric actuator subsystems overlap as suggested by the dashed line 415. The distance between base connection element 110 and load connection element 112 is thus less than the sum of the constructional length of a piezoelectric actuator 410 of the first piezoelectric actuator subsystem and the constructional length of a piezoelectric actuator 416 of the second piezoelectric actuator subsystem. This has the effect that the deviation of the interface is increased in comparison with an interface (such as that depicted in FIG. 1) without a coupling element 412, the distance between base connection element 110 and load connection element 112 remaining the same.

In this exemplary embodiment, the diaphragm 122 is fixed to the load connection element 112 similarly to the example shown in FIG. 1 but the circular connection element 124 was omitted. Instead, a flat cylindrical milled recess 312 is inserted into the load connection element 112, over which the diaphragm 122 is spanned. The diaphragm 122 is bonded to the load connection element 112 along its edge. It will thus be appreciated that the function of the two above described embodiments is substantially identical and differs only in that two cooperating sets of actuators coupled together by a connector element are used in the second embodiment instead of the single set of actuators used in the first embodiment.

Figure 5:
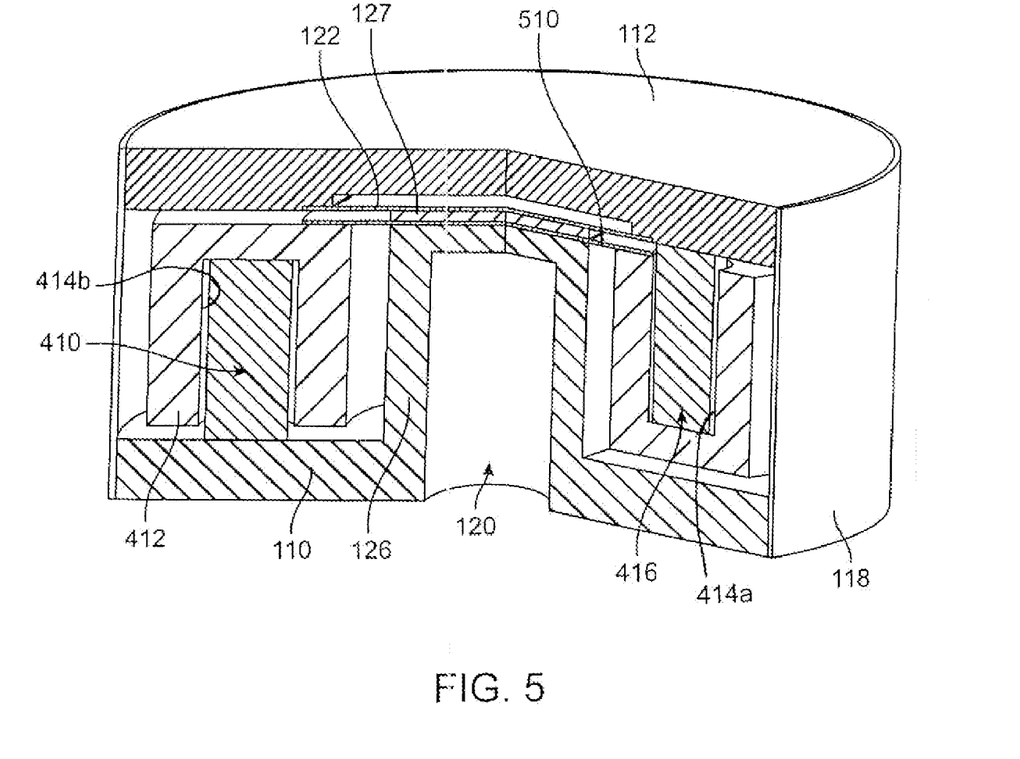
FIG. 5 shows a third embodiment of an interface with a diaphragm for shear diversion in a perspective partial representation with cut-out segment.

FIG. 5 shows a further alternative embodiment of an interface for vibration damping in a perspective part representation with cut-out segment. The structure is basically similar to the example shown in FIG. 3 and FIG. 4. In this embodiment, however, the connection element 126 of the shear diverting element 120 is constructed as a hollow cylinder. This saves further space since, for example, control electronics (e.g. for an active vibration control) can be accommodated in the hollow space of the connection element 126. As in the previous embodiments the diaphragm 122 for shear diversion is screwed or otherwise connected to the distal end of the connection element 126 at the center.

Furthermore, FIG. 5 shows the additional incorporation of a second centering element 510 in the form of a further circular metal diaphragm disposed in parallel spaced relationship to the diaphragm 122 and separated therefrom by a spacer 127. Along its circumference, this diaphragm is bonded or otherwised attached to the circular coupling element 412. In its center, the diaphragm 510 is screwed or otherwise connected to the distal end of the connection element 126, and thereby connected to the base connection element 110. The diaphragm prevents a change in position of the coupling element 412 with respect to the connection element 126 perpendicular to the preferred direction but allows a displacement of the coupling element 412 in the preferred direction. It will thus be appreciated that this embodiment is substantially identical to the above described second embodiment except that the second diaphragm 510 is added to restrict lateral motion of the coupling element relative to both the base connection element 110 and the load connection element 112.

Reference Designations

110 Base Connection Element
112 Load Connection Element
114 Piezoelectric Actuator
116 Piezoelectric Actuator
118 Pretensioning Element 120 Shear Diverting Element
122 Diaphragm
124 Connection Element
126 Connection Element
128 Accelerometer
130 Control Electronics
132 Amplifier Electronics
134 Axis of Symmetry
210 Connection element to the base connection element 110
212 Area of engagement of the base connection element 110
214 Connection element to the load connection element 112
216 Area of engagement of the load connection element 112
218 Force parallel to the preferred direction of the energy converting system
220 Force perpendicular to the preferred direction of the energy converting system
310 Blind Holes
312 Cylindrical Milled Recess
410 First Piezoelectric Actuator System
412 Coupling Element
414 Blind Holes
416 Second Piezoelectric Actuator System
510 Centering Element
List Of Quoted References
U.S. Pat. No. 5,660,255
DE 195 27 514 C2
N. W. Hagood and A. von Flotow: *Damping of Structural Vibrations with Piezoelectric Materials and Passive Electrical Networks*, Journal of Sound and Vibration 146 (2), 243 (1991).
D. Mayer, Ch. Linz and V. Krajenski: *Synthetische Induktivitäten für die semi-passive Däcmpfung*, (Synthetic inductances for semi-passive damping) fifth Magdeburger machine construction days, 2001.

The invention claimed is:

1. An interface for controlling mechanical vibrations, comprising
   a base connection element;
   a load connection element disposed in spaced apart relationship with the base connection element ;
   at least one energy converting system extending between the base connection element and the load connection element and operative to exert or respond to forces in a preferred direction tending to change the separation between said base connection element and said load connection element, said preferred direction being parallel to an axis extending through both said base connection element and said load connection element;
   at least one elastic pretensioning element connecting the base connection element and the load connection element and exerting a mechanical preload in said preferred direction on the energy converting system;
   at least one shear diverting element disposed between the base connection element and the load connection element, said shear diverting element including a first generally two-dimensional element flexible in said preferred direction and a connector element, said first two-dimensional element extending transverse to the preferred direction and having a central portion thereof spaced from said load connection element, said first two-dimensional element being affixed to said load connection element on opposite sides of said central portion, said base connection element being joined to said first two-dimensional element by said connector element.

2. An interface for controlling mechanical vibrations as recited in claim 1 wherein said first two-dimensional element is a diaphragm or leaf spring that is flexible in said preferred direction.

3. An interface for controlling mechanical vibrations as recited in claim 1 wherein said connector element includes an elongated centering element having one extremity affixed to said base connection element, and a second extremity connected to the central portion of said first two-dimensional element.

4. An interface for controlling mechanical vibrations as recited in claim 3 and further comprising a coupling element disposed between said base connection element and said load connection element, and wherein said energy converting system includes a first energy converting sub-system connected to said base connection element, and a second energy converting sub-system connected to said load connection element, said first and second energy converting sub-systems being coupled together by said coupling element.

5. An interface for controlling mechanical vibrations as recited in claim 4 wherein said coupling element includes a generally annular member having a central opening through which said centering element extends, and wherein at least one of said first and second energy converting sub-systems includes a plurality of piezoelectric actuators distributed at regular intervals around said axis.

6. An interface for controlling mechanical vibrations as recited in claim 5 wherein said coupling element is adapted to functionally interconnect the actuators of said first and second sub-systems in overlapping disposition.

7. An interface for controlling mechanical vibrations as recited in claim 6 wherein said shear diverting element further includes a second generally two-dimensional element disposed in spaced apart relationship with said first two-dimensional element, said second two-dimensional element having a central portion thereof affixed to said elongated coupling element, and the outer extremities thereof affixed to said coupling element.

8. An interface for controlling mechanical vibrations as recited in claim 5 and further comprising an electronic circuit connected to said actuators to accomplish active, passive or semi-active or semi-passive vibration reduction.

9. An interface for controlling mechanical vibrations as recited in claim 5 wherein the positions of the piezoelectric actuators of said first subsystem are angularly offset about said axis relative to the positions of the piezoelectric actuators of said second subsystem.

10. An interface for controlling mechanical vibrations as recited in claim 1 and further comprising an electronic circuit connected to said energy converting system to accomplish active, passive or semi-active or semi-passive vibration reduction.

* * * * *